United States Patent [19]

Ohkawa

[11] 4,263,097

[45] Apr. 21, 1981

[54] METHOD AND APPARATUS FOR DRIVING A CONTINUOUS CURRENT IN A TOROIDAL PLASMA

[75] Inventor: Tihiro Ohkawa, La Jolla, Calif.

[73] Assignee: General Atomic Company, San Diego, Calif.

[21] Appl. No.: 771,114

[22] Filed: Feb. 23, 1977

[51] Int. Cl.² ............................................. G21B 1/00
[52] U.S. Cl. ........................................ 176/5; 176/9
[58] Field of Search ............................. 176/1, 3, 5, 9

[56] References Cited

U.S. PATENT DOCUMENTS

| | | | |
|---|---|---|---|
| 3,090,737 | 5/1963 | Swartz | 176/5 |
| 3,425,902 | 2/1969 | Consoli et al. | 176/3 |
| 3,433,705 | 3/1969 | Cornish | 176/3 |
| 3,523,206 | 8/1970 | Drabier et al. | 176/3 |
| 3,668,067 | 6/1972 | Christofilos | 176/5 |
| 3,728,217 | 4/1973 | Dandl | 176/3 |
| 3,749,639 | 7/1973 | Kapitza | 176/3 |
| 3,831,101 | 8/1974 | Bewford et al. | 176/5 |
| 4,057,462 | 10/1977 | Jassby et al. | 176/5 |

Primary Examiner—Samuel W. Engle
Assistant Examiner—S. A. Cangialosi
Attorney, Agent, or Firm—Fitch, Even, Tabin, Flannery & Welsh

[57] ABSTRACT

Method and apparatus for continuously driving a current in a toroidal plasma through r-f induced, asymmetric trapping or detrapping. The method and apparatus may be used to supply ohmic current over a prolonged or indefinite time period and thus provide for steady state operation of toroidal plasma apparatus such as tokamaks.

9 Claims, 3 Drawing Figures

METHOD AND APPARATUS FOR DRIVING A CONTINUOUS CURRENT IN A TOROIDAL PLASMA

The present invention is directed to the production, control and confinement of plasma in systems involving a generally toroidal plasma configuration, and more particularly is directed to the driving of a plasma current in such systems.

Various apparatus has been developed for confining plasmas, which are ionized gases comprising approximately equal numbers of positively charged ions and free electrons at high temperatures.

One general type of device for plasma confinement comprises an endless, closed tube, such as a toroid, with a geometrically co-extensive, externally imposed magnetic field (e.g., a toroidal magnetic field) in which magnetic lines of induction extend around the toroid generally parallel to its minor axis. Such a magnetic field is conventionally provided by electrical currents in one or more conductive coils encircling the minor axis of the toroid. Illustrative of such devices are the toroidal diffuse pinch plasma confinement devices of the Tokamak configuration, and such devices may be generally referred to hereinafter as tokamak devices or systems. The toroidal configuration may be advantageously employed with plasmas and plasma confinement systems of noncircular cross-section either with respect to planes perpendicular to the minor axis or the major axis such as those involving plasma configurations which are axisymmetrically elongated in a direction parallel to the major toroidal axis. In this connection, U.S. Pat. Nos. 3,692,626 and 3,801,438 illustrate plasma generation and confinement apparatus of the toroidal type having a noncircular cross-section in respect of a plane parallel to and intercepting the major toroidal axis.

As previously indicated, toroidal systems for the containment of high-temperature plasmas comprise means for providing a strong, toroidal magnetic field in which the plasma is to be embedded, and which is conventionally provided by electrical current in one or more conductive coils encircling the minor toroidal axis. The term "axis" is used herein to include multiple axes or axial surfaces, such that reference to toroidal diffuse pinch systems may include such systems having a noncircular crosssection. Conventional toroidal plasma systems may also comprise means for providing a toroidal electric field to produce a current flowing in the plasma, generally in the direction of the minor axis, and this plasma current in turn may generate a magnetic field component which is poloidal (i.e., the magnetic flux lines are closed about the minor toroidal axis). The combination of the poloidal magnetic field produced by the plasma current, with the toroidal magnetic field produced by the toroidal coil current, is suitable for providing helix-like magnetic field lines that generally lie on closed, nested magnetic surfaces. The plasma is accordingly subjected to confining, constricting forces generated, at least in part, by the current flowing in the plasma. The resulting magnetic field provides for a diffused pinching force in the confining magnetic field which may be substantially greater than the outward pressure of the plasma.

The generation of a current in the plasma may conventionally be provided by providing current in an inductive primary coil configured such that the plasma serves as the secondary coil of a transformer system. Such inductive current further provides for inductive, ohmic heating of the plasma. However, such inductive plasma current generation utilizes pulsed current in the primary winding, and can only sustain an ohmic current in the plasma for brief time periods before the peak current in the primary is reached and begins to decay. Such factors limiting the time duration of inductively produced plasma current are a substantial disadvantage and have the effect of limiting the performance and operating parameters of toroidal plasma systems.

However, steady state operation of toroidal plasma systems is a recognized goal in the development of plasma technology and substantial effort in the art has been directed to non-inductive methods which might provide the capability for steady-state operation. Substantial effort has also been directed to methods for heating of plasmas.

Techniques currently being considered for providing auxiliary heating in toroidal plasma apparatus include high energy neutral beam injection, radio frequency heating and bootstrap current. [T. Ohkawa, Nuclear Fusion 10, 185 (1970); Messjaen, et al., Nuclear Fusion 15, 75 (1975); D. Wort, Plasma Physics 13, 258 (1971); Kadomtsev, et al., Plasma Physics and Controlled Nuclear Fusion Research (Proc. 5th Int. Conf. Madison, 1971) 2 IAEA 110 (1971); Bickerton, et al., Nature, Phys. Science 229, 110 (1971); patents and papers referred to herein are hereby incorporated in this specification by reference].

Due to long-range electromagnetic interactions between charged particles and external electromagnetic fields, there exists a host of collective motions (waves) in the plasma [T. H. Stix, "The Theory of Plasma Waves," McGraw-Hill, New York (1962)]. The existence of these waves provide a means for coupling of external electromagnetic energy such as radio frequency (r-f) electromagnetic wage energy into the plasma. Various of the plasma waves which may have utilization in respect of plasma heating, in ascending frequency, are: alfven waves, ion cyclotron waves, lower hybrid waves, and electron cyclotron waves.

In connection with Alfven wave plasma heating, for frequencies below the ion cyclotron frequency, $\omega < \omega_{ci}$, there are two modes with the dispersion relations $$\omega^2 = k_\perp^2 V_A^2$$

$$\omega^2 = k^2 V_A^2$$

where $V_A = \sqrt{B^2/4\pi m_i n_i}$ is the Alfven speed, k is the wave number and $\perp$ denotes the component perpendicular to the magnetic field, and $m_i$, $n_i$ are the mass and density of the plasma ions. The plasma motion of the first mode is an incompressible shearing motion and the wave is called the shear Alfven waive or torsional Alfven wave. The plasma motion in the second mode is a compressional one with a phase velocity faster than both that of the shear mode and the sound speed. The wave is called a compressional Alfven wave or fast magnetosonic wave. For typical fusion grade plasmas, the frequency of the shear Alfven wave is less than 1.0 MHz and the vacuum wave length is the order of several meters. An r-f coupling structure may comprise coils surrounding the plasma and located inside the metallic vacuum vessel, in order to prevent shielding of the r-f field. In a confined plasma, the shear Alfven wave has a continuous spectrum for a given wave number which may be fixed by the coil structure. According to conventional theory, at the resonant layer $x_n$ where the driving frequency matches the local shear Alfven frequency $\omega = k_{\parallel} V_A X_n$ (subscript $\parallel$ denotes the component parallel to the magnetic field phase mixing occurs and wave energy is damped [Chen and Hasgawa, *Phys. Fluids* 17, 1399 (1974); J. Tataronis, *J. of Plasma Phys.* 13, 87 (1975)]. Alfven wave heating mechanisms might presently be considered to potentially involve transient time magnetic pumping, electron Landau damping, ion viscous damping or some nonlinear process, but are not presently fully understood or fully utilized in plasma systems. The development of effective plasma heating systems utilizing Alfven wave interaction would provide for realization of potentially favorable characteristics of this form of heating, including the relatively low frequency of the waves and the conventional availability of relatively inexpensive power sources for this frequency range. Furthermore, losses between an r-f generator and the plasma can in principle be made very small (e.g., less than 10%) in respect of r-f-Alfven wave coupling. However, disadvantages of conventional Alfven wave utilization include the requirement for protection and cooling of the coils within the metallic vessel and possible large impurity production. Furthermore, because the frequency range is below the ion cyclotron frequency range, Alfven wave excitation may induce enhanced plasma loss. Conventional Alfven wave heating techniques have not been thoroughly tested on tokamaks, although low power experiments have been conducted.

As the frequency $\omega$ approaches the ion cyclotron frequency $\omega_{ci}$, the shear Alfven wave becomes an ion cyclotron wave with frequency $\omega_{ci}$ and is left-hand polarized (in the same sense of ion gyration). As $\omega$ increases beyond $\omega_{ci}$, this wave disappears due to the ion cyclotron damping. On the other hand, the compressional mode has a high percentage of right-hand polarization and is only weakly damped by the ion cyclotron damping for frequencies at the ion cyclotron frequency and disappears only at the electron cyclotron resonance. In the frequency range above the ion cyclotron frequency, it can also heat electrons via transient time magentic pumping.

Since the ion cyclotron wave is heavily damped and its propagation region is generally confined to the high magnetic field side of the resonance, it is not readily adapted for heating in tokamak type machines in which little space is available in the high field region. However, the compressional wave propagates around the torus. Experiments on the ST Tokamak at a frequency near the second harmonic $2\omega_{ci}$ have demonstrated good heating, and similar results have also been obtained in Tokamak TO-1 with a loop exciter [Ivanov and Kovan, Proc. IAEA Conf. (Tokyo) Vol I (1974) p. 231]. Fast magnetosonic wave experiments are currently being carried out on the TFR Tokamak as well.

For typical fusion grade plasma, the frequency may be in the 10 MHz range and the vacuum wavelength may be on the order of about a meter. The excitation structures in such a system may comprise coils surrounding the plasma or large wave guides with a size of one-half meter or so. Wave guide coupling is considered favorable as the wave guides can also be used as pumping ports. In a plasma with two ion species, the fast magnetosonic wave can also paraneterically excite the two ion Buchsbaum modes [J. Adam et al., paper A3-2 in IAEA-CN-33 (1974)] which may result in nonlinear heating [Sperling and Perkins, *Phys. Fluids* 17, 1857 (1974)].

Favorable characteristics of this form of heating include the fact that the r-f power is available and not too expensive. The power may be fed into the plasma system by means of waveguides which might also be used for pumping ports. The method has been tested on ST Tokamak and the theoretically predicted eigenmodes were observed, with wave generation efficiencies of up to 90%. At $\omega_o = \omega_{ci}$, the ion temperature was doubled ($\Delta T_i = 100$ eV) with 20% heating efficiency. No deleterious effects on confinement due to the r-f field was observed. Even in the linear region, plasma heating is reasonably good and the physics of heating is simple. Disadvantages of conventional ion cyclotron wave heating proposals include the eigenmode frequency change as the density varies, requiring wave generation systems with sufficient bandwith to follow an eigengrequency. Moreover, as demonstrated in r-f experiments on the ST Tokamak, there may be significant production of impurities, (possibly resulting from the low field and low current required to obtain resonance for the ST Tokamak) and the heating of particles on ion "banana" orbits that hit the wall. While such problems may presumably be alleviated in larger tokamaks in which r-f heating might be specifically designed to heat only the plasma core, such systems have not been developed.

The lower hybrid plasma wave has the dispersion relation $$\omega = \omega_{pi} \left(1 + \frac{k_{\parallel}^2}{k^2} \frac{m_i}{m_e}\right)^{\frac{1}{2}} \bigg/ \left(1 + \frac{\omega_{pe}^2}{\omega_{ce}^2}\right)^{\frac{1}{2}}.$$

The lower hybrid wave is a slow electrostatic wave, and for a fusion grade plasma, its frequency made be in the range of a few GHz, which is the upper limit below which relatively inexpensive power systems are conventionally available. The vacuum wavelength may be in the range of 10 cm. In order to have access to the resonant region without first crossing a region where it becomes evanesent, the wave must have a wave number parallel to the field line satisfying the following relationship:

$$\frac{k_{\parallel} C}{\omega} > \left(1 + \frac{\omega_{pe}^2}{\omega_{ce}^2}\right)^{\frac{1}{2}}.$$

Therefore, properly-phased wave guides are required for the coupling [Brambilla, M., in "Symposium on Plasma Heating in Toroidal Devices," Varenna, Italy (1974) p. 113]. According to the linear theory the incident wave, traveling in the magnetized plasma with a gradually increasing density, will convert into a slow electrostatic mode in the vicinity of the lower hybrid resonant layer [Stix, T. H., *Phys. Rev. Lett* 15, 878 (1965); Piliya, A. D., and V. I. Fedorov, *Sov. Phys. JEIP* 33, 210 (1971), and 30, 653 (1970]. The converted, short-wavelength electrostatic mode may heat the plasma by either linear ion Landau damping or cyclotron damping, and nonlinear parametric processes may also be involved. In the nonlinear parametric processes, the incoming wave may parametrically excite a short-wavelength lower hybrid mode plus either a backward ion cyclotron wave, an ion Bernstein mode, or an ion quasi-mode [Sperling, J., and C. Chu, "Sherwood Annual Theory Meeting," Madison, Wis. (1976); Berger, R. L., and F. W. Perkins, *Phys. Fluids* 19, 406 (1976); Rogister, A., and G. Hasselberg, *Phys. Fluids* 19, 108 (1976); Porklab, M., *Phys. Fluids* 17, 1432 (1974)]. Such instabilities may lead to large internal electrical fields and anomalous heating of the plasma. The amount of energy fed into the electrons and ions depends upon the angle of propagation of the daughter waves. The electrons are heated in the parallel direction while ions are heated in the perpendicular directions. Similar results have been observed experimentally. [Kitsenko, A. B., et al., *Nucl. Fusion* 13, 557 (1973)], and recent results on the ATC and Alcator systems indicate plasma heating by nonlinear processes. The Tokamak FT-1 shows strong collisional absorption in the vicinity of the resonance with possible parametric heating for the ions [Golant, V. E., et al., *Proc. of IAEA Conf.* (Tokyo), Vol. I, (1974) p. 231].

Favorable characteristics of the lower hybrid resonance frequency are that the frequency is much higher than the ion cyclotron frequency, so that the field-induced diffusion may not be as detrimental as experiments might presently indicate. Moreover, the heating is localized and is suitable for profile control purposes. However, the accessibility condition is not completely understood at present. There are some indications that nonlinear effects could be important in wave propagation. However, heating by nonlinear processes is hard to control; the heating mechanism is not well understood, and resolution of uncertainties concerning the complex mechanisms involved by conventional lower hybrid resonance heating proposals will require additional experimental evidence and theoretical studies.

In respect of conventional proposals for r-f plasma heating, it is recognized that the higher the frequency and the shorter the wavelength of the wave, the less deleterious it is on plasma confinement. High frequency waves with frequencies near the electron cyclotron frequency $\omega_{ce}$ or the second harmonic $2\omega_{ce}$, can be absorbed by electrons via electron cyclotron damping. These waves have a vacuum wavelength in the millimeter range. Conventional approaches for coupling and injection are relatively simple, and the effect of such waves on plasma confinement may be beneficial [Alikaev, V. V., et al., MATT-TRANS-120 (1976)]. Commercially available power sources at the indicated wavelengths are undesirably expensive for economical fusion grade plasma heating, but commercial development of high power, millimeter wavelength sources to provide high power, single tubes is presently being carried out.

Radio frequency heating has various potential advantages over neutral beam injection techniques. The conversion rate of wave energy into thermal energy can potentially be made considerably larger than the slowing-down rate of energetic ion beams. Radio frequency heating is less sensitive to charge-exchange; therefore, impurity generation by high energy neutrals may be greatly reduced. Furthermore, the penetration of neutral beams is more difficult with increasing machine size and higher plasma density. While wave energy penetration may also be more difficult under such conditions, wave heating may be more flexibly chosen to heat the bulk or the tail of the distribution function.

However, despite the potential advantages of r-f heating there are disadvantages with respect to various of the conventional radio frequency heating approaches, and new developments in radio frequency plasma heating technology would be desirable. Furthermore, such conventional r-f technology does not provide for the maintenance of a continuous plasma current for magnetic field generation.

Accordingly, it is an object of the present invention to provide new methods and apparatus for providing plasma current in toroidal plasmas of the tokamak type. Other objects will become apparent from the following description and the corresponding drawings, of which:

Generally, the present invention is directed to methods and apparatus for driving a toroidal plasma current by asymmetrically altering the magnetically trapped particle population of the plasma.

In connection with various of the apparatus aspects of the present invention, there is provided an improvement in toroidal plasma confinement systems comprising means for assymmetrically altering the trapped particle population of a plasma confined by the system to provide ohmic current in the plasma. Generally, conventional component elements of such toroidal plasma systems are well-known. For example, toroidal plasma confinement systems for the generation and containment of high-temperature plasmas may comprise means for providing a strong, toroidal magnetic field in a toroidal plasma zone in which the plasma is to be embedded, and which may be provided by passage of electrical current through one or more conductive coils encircling the minor toroidal axis. Such systems also comprise means for generating a plasma in the plasma zone, which may include means for providing at least an initial toroidal plasma current which current in turn generates a poloidal magnetic field component. The combination of the poloidal magnetic field and the toroidal magnetic field produces resultant magnetic field lines that lie on closed, nested surfaces, and the plasma is subjected to confining, constricting forces generated by the current flowing in it. Such conventional aspects of toroidal plasma systems are known to the art and need not be described in detail herein.

As indicated, the apparatus of the present invention, in addition to conventional toroidal plasma elements, further comprises means for asymmetrically altering the trapped plasma particle population to produce a plasma current. Such asymmetric, trapped particle population altering means preferably comprises means for selectively trapping plasma electrons in a predetermined direction with respect to the minor toroidal axis. Such selective trapping means may comprise means for providing a radio frequency field (including resolvable components of such field) which propagates in a direction parallel to the plasma-confining magnetic field, which has its electric field vector perpendicular to the magnetic field, and which is at resonance with a plasma resonance frequency to increase electron perpendicular velocity to asymmetrically trap plasma electrons. The apparatus may further include means for asymmetrically trapping plasma ions in a manner which is current-complementary to the electron trapping.

As indicated, a preferred aspect of the present invention involves asymmetrical trapping of charged particles in the toroidal plasma. In a high temperature toroidally confined plasma, there is a population distribution with respect to the energy of the plasma particles, and with respect to the velocity vectors of the particles. If a charged particle such as an electron has a velocity component which is perpendicular to the magnetic field, it will describe a generally circular orbit in a magnetic field of constant strength. If in addition to the perpendicular velocity component, the particle further has a velocity component parallel to the constant magnetic field, the particle will generally describe a simple spiral path in motion through the constant magnetic field. However, in a toroidal magnetic confinement system, the magnetic field is not of uniform strength, and this non-uniformity affects the plasma particle paths in a relatively complicated manner. Because of the variation of magnetic field strength with respect to the radial distance from the major axis, with the field strength being greater at shorter radii, the existence of a parallel velocity component in the particle motion results in particles travelling into increasing, or decreasing magnetic fields. As the particle moves into a magnetic field which is increasing in strength, the parallel velocity decreases in the stronger field. For a combination of parallel and perpendicular velocity components of charged particle motion in a confining toroidal magnetic field, there is a magnetic field strength for which a particle having such velocity components will stop moving in a direction parallel to the magnetic field, and will reflect back in the opposite direction. For a given parallel velocity component, moreover, it is found that the larger the perpendicular velocity component of a given charged particle with respect to the magnetic field, the sooner the particle stops and is reflected.

In a tokamak system, under given conditions of operation, there is a statistical population with respect to particle velocity components. Some of the particles in the distribution spectrum will have a parallel velocity which is large enough (with respect to their respective perpendicular velocity components) so that the particles will slow down but will pass through the high magnetic field region. These particles are not trapped and continue to propagate around the toroidal system in the same general direction with a velocity component parallel to the magnetic field. However, there are statistically also a number of particles for which the parallel velocity is not sufficiently large (with respect to their respective perpendicular velocity components) to permit the particles to pass through the high magnetic field. These particles are "trapped," and reflect back and forth with respect to the minor axial direction. These "trapped" particles do not contribute to the net toroidal current.

The velocity distribution of particles is a dynamic coulomb collisional process so that trapped plasma particles may, through collision or other interaction, be changed in respect of their velocity components so that they have sufficient parallel velocity to pass through the high magnetic field region of the toroidal magnetic field. Such particles thus become detrapped. In the conventional operation of a toroidal plasma component system this detrapping is statistically symmetrical in respect of the minor toroidal axis, and makes no net contribution to plasma current.

Similarly and concomitantly with the normal particle detrapping, charged particles which are not trapped may acquire velocity components which are insufficient to pass through the high magnetic field regions, and accordingly become trapped. This charged particle trapping rate is also statistically symmetrical with respect to the minor toroidal axis in conventional toroidal plasma system, and also does not have a net effect on the plasma current.

Such toroidal magnetic confinement systems may be considered to be a magnetic mirror with symmetrical mirror strength. However, if an effectively asymmetrical toroidal mirror could be provided, the net ohmic current can be affected.

Asymmetrical mirror systems will now be generally discussed prior to describing a specific embodiment of apparatus of the present invention.

In a simple magnetic mirror confinement system with asymmetric mirror strength, charged particles trapped initially between mirrors will escape due to Coulomb collisions. Since the Coulomb collisions are predominantly small angle scattering, over a period of time, substantially all particles trapped in the asymmetrical magnetic mirror will eventually escape through the weak mirror as Coulomb collisions redistribute the particle energy distribution, thus producing mechanical momentum.

In accordance with the present invention, an asymmetric magnetic mirror is effectively provided by the interaction of a specified radio frequency field with the symmetrical magnetic mirror of a toroidal magnetic confinement system. The theoretical aspects of this interaction are discussed in the following description with respect to the asymmetrical trapping of plasma electrons. If initially empty magnetic mirrors are placed in a plasma where particles are all initially untrapped, a radio frequency field may be applied to increase the perpendicular energy of particles and to cause a selective trapping of particles. The radio frequency field is a travelling wave and the heating rate is larger for particles travelling in one direction. This will result in asymmetric trapping, thereby producing an increase in momentum (and thus temperature) in the over-all particle ensemble of the confined plasma.

As indicated previously in an axisymmetric torus configuration, such as the magnetic confinement configuration of tokamak and doublet plasma systems, electrons are trapped in a magnetic mirror produced by a toroidal magnetic field. For purposes of illustration, a simple plasma of unifrom density and temperature will be utilized in the following discussion which in the absence of any electric field, has an isotropic and Maxwellian particle velocity distribution. In sphereical coordinates in velocity space, the velocity components of such a simple plasma in directions parallel to the confining magnetic field and perpendicular to the confining magnetic field may be represented as follows:

$$\begin{cases} v_\perp = v \sin \theta \\ v_\parallel = v \cos \theta \end{cases} \quad (1)$$

where suffixes $\perp$ and $\parallel$ denote components perpendicular and parallel to the magnetic field, respectively.

The distribution function, f, of particles may be defined at the minimum of magnetic field strength on a flux surface, since all orbits pass through the minimum field. The undisturbed distribution function, $f_o$, is a Maxwellian function and may be given by:

$$f_o = n_o \left(\frac{m}{2T\pi}\right)^{3/2} \exp\left[-\frac{mv^2}{2T}\right]. \tag{2}$$

The trapped particles of the toroidally confined plasma are in the region $$\theta_c < \theta < \pi - \theta_c \tag{3}$$

where $\sin \theta_c = (B_{min}/B_{max})^{\frac{1}{2}}$, $B_{min}$ and $B_{max}$ are the minimum and the maximum field strength of a toroidal system.

When a radio frequency electric field is provided which propagates parallel to the lines of flux of the magnetic field, and which is oriented such that the electric field plane of the radio frequency wave is perpendicular to the magnetic field, selective interaction with the parallel velocity of charged particles such as electrons may be provided. The frequency and the wave number of the field may, for example, be chosen such that the Doppler-shifted frequency is at resonance with a particle resonance frequency, such as the cyclotron resonance frequency.

$$\omega - k_\parallel v_\parallel = \Omega \tag{4}$$

where $\omega$ and $k_\parallel$ are the frequency and the wave number of the radio frequency field and $\Omega$ is the particle frequency. The acceleration or heating of particles may be regarded as stochastic (i.e., after a particle passes through a region of radio frequency field with a length l, the phase relation is substantially lost before the next passage), such that the heating process may be described as a diffusion in velocity space. For the case of the cyclotron heating, the equation of motion may be represented as follows:

$$\frac{d}{dt}(v_x + iv_y) = +i\Omega_e(v_x + iv_y) - (e/m_e)E_\perp \exp[-i(\omega - k_\parallel v_\parallel)t] \tag{5}$$

where $E_{195}$ is the radio frequency field and $\Omega_e$ is the electron cyclotron frequency.

The perpendicular velocity gain $\Delta v_\perp$ per pass through the radio frequency field (such as provided by appropriate antenna elements) is roughly given by $$(\Delta v_\perp)^2 \sim \frac{(e/m_e)^2 E_\perp^2}{(\omega - k_\parallel v_\parallel - \Omega_e)^2 + v_\parallel^2/l^2}. \tag{6}$$

The number of passages per unit time may be represented by $v_\parallel/L$ where L is the length of the system and is equal to $2\Omega R_o q$ for a circular cross-section tokamak plasma confinement system. $R_o$ is the major radius and q is the safety factor in the preceding equation. Then the diffusion coefficient, $D_\perp$, may be represented by the following relationship:

$$D_\perp \sim \left(\frac{v_\parallel}{L}\right) \frac{(e/m_e)^2 E_\perp^2}{(\omega - k_\parallel v_\parallel - \Omega_e)^2 + v_\parallel^2/l^2}. \tag{7}$$

For the case of resonance occuring at $v_\parallel = v_{\parallel o}$, the following further relationship may be provided.

$$\omega = \Omega_e + k_\parallel v_{\parallel o} \tag{8}$$

The diffusion coefficient, $D_\perp$, may then be considered to be:

$$D_\perp \sim \left|\frac{v_\parallel}{L}\right| \frac{(e/m_e)^2 E_\perp^2}{k_\parallel^2 (v_\parallel - v_{\parallel o})^2 + v_\parallel^2/l^2}. \tag{9}$$

For the resonance to be reasonably sharp, the following condition should be substantially observed:

$$k_\parallel l >> 1 \tag{10}$$

For electron cyclotron resonance heating, $k_{81} \cong \omega/c$ and Equation (10) becomes $$l >> \frac{c}{\Omega_e}. \tag{11}$$

This condition may be readily satisfied.

However, in a toroidal plasma confinement system, the magnetic field strength is not uniform, and the resonance condition is satisfied with different values of undisturbed parallel velocity $v_{\parallel o}$ on different flux surfaces of the confining magnetic field. By rewriting Equation (8) the following relationship may be obtained:

$$v_{\parallel o} = c(1 - \Omega_e/\omega) \tag{12}$$

Therefore, in order that the undisturbed parallel velocity $v_{\parallel o}$ at the minimum region of magnetic field strength, be undirectional, the variation $\alpha\Omega_e$ in the cyclotron frequency should not exceed $\sqrt{2T/m_e c^2 \Omega_e}$.

The equation for the electron distribution function is given by $$\frac{\partial f}{\partial t} - \frac{1}{v_\perp} \frac{\partial}{\partial v_\perp}\left(D_\perp v_\perp \frac{\partial f}{\partial v_\perp}\right) = F. \tag{13}$$

The righthand side of the preceding equation contains the terms responsible for electron-ion collisional drag and for the cooling of electrons by either transport of collisions. Equation (13) may be linearized with the substitutions $f = f_o + f_1$ and $f_1 << f_o$, to provide the following relationship:

$$\frac{\partial f_1}{\partial t} - \frac{1}{v_\perp} \frac{\partial}{\partial v_\perp}\left(D_\perp v_\perp \frac{\partial f_o}{\partial v_\perp}\right) = F(f_1). \tag{14}$$

The heating rate, W, may be represented by:

$$W = 2\pi \int \frac{m_e v_\perp^2}{2} \frac{\partial}{\partial v_\perp}\left(D_\perp v_\perp \frac{\partial f_o}{\partial v_\perp}\right) dv_\perp dv_\parallel. \tag{15}$$

The preceding relationship may be used in the calculation of the heating rate, W, as follows. By partial integration, Equation (15) becomes:

$$W = -\frac{\pi m_e^2}{T} \int v_\perp^2 D_\perp f_o d(v_\perp^2) dv_\parallel. \tag{16}$$

The heating rate solution of this equation may be approximated by $$D_\perp = \frac{l^2}{|v_{\|o}|L}\left(\frac{e}{m_e}E_\perp\right)^2, \quad v_{\|o}-\Delta v_\| < v_\| < v_{\|o}+\Delta v_\| \tag{17}$$

$$= 0 \text{ elsewhere}$$

where $\Delta v_\| = |v_{\|o}|/k_\| l$ and $\Delta v_\| \ll |v_{\|o}|$. Then we have $$W = 4\frac{l}{k_\|L}\frac{(eE_\perp)^2}{m_e}\left(\frac{m_e}{2T\pi}\right)^{1/2} n \exp\left(\frac{-m_e v_{\|o}^2}{2T}\right). \tag{18}$$

In steady state operation of a toroidal plasma system, the heating due to the application of a radio frequency trapping (or detrapping) field is balanced by energy loss of the plasma represented by the root mean square of Equation (14). By representing the loss term by $3nT/\tau_E$ is the energy confinement time, the following relationship may be provided:

$$W \leq 3nT/\tau_E. \tag{19}$$

The preceding inequality is used to account for cases in which additional heating methods are used in the system, and the present invention does contemplate embodiments including additional or auxiliary heating means.

The trapping rate may now be discussed in view of the preceding disclosure. In this connection, the particle flux $\Gamma$ across the $\theta=\theta_c$ boundary of a toroidal plasma system may be represented by:

$$\Gamma = -2\pi \left. v_\perp D_\perp \frac{\partial f_o}{\partial v_\perp} dv_\| \right|_{\theta=\theta_c}. \tag{20}$$

By using Equation (17), the following additional relationship for the particle trapping flux, $\Gamma$, may be obtained.

$$\Gamma = 8\frac{n}{\sqrt{\pi}}\left(\frac{l}{k_\|L}\right)\left(\frac{e}{m_e}E_\perp\right)^2 v_{\|o}^2\tan^2\theta_c\left(\frac{m_e}{2T}\right)^{5/2}\exp\left(-\frac{m_e}{2T}\frac{v_{\|o}^2}{\cos^2\theta_c}\right). \tag{21}$$

This asymmetrical particle trapping flux is balanced by collisional detrapping in a steady state operation of the system after equilibrium is reached. Since the trapping is asymmetrical with respect to the parallel velocity component $v_\|$, and detrapping is symmetric, the untrapped population will gain a net momentum. The change in trapped population $n_1$ may be calculated by equating the flux $\Gamma$ with the collisional detrapping flux as follows:

$$\Gamma \approx \nu n_1 (\pi-\theta_c)^{-2} \tag{22}$$

where $\nu$ is the collision frequency.

In a steady state, this momentum gain is balanced by the collision between plasma electrons and plasma ions. The current density, j, generated may be represented by $$j = \frac{m_e\sigma}{en} v_{\|o}\Gamma \tag{23}$$

where $\sigma$ is electrical conductivity.

By combining Equations (22) and (23), the following ratio relationship may be provided:

$$n_1/n_o \approx (\pi-\theta_c)^2 j/(ev_{\|o}n_o). \tag{24}$$

For typical tokamak operating parameters, the current density j is much less than the total current flux at the minimum (i.e., $j \ll ev_{\|o}n_o$) and therefore $$n_1/n_o \ll 1 \tag{25}$$

Accodingly, the linearization of Equation (13) is justified.

By using Equation (18), the flux $\Gamma$ may be represented in terms of the heating rate, W, as follows:

$$\Gamma = \frac{m_e v_{\|o}^2}{2T^2}\tan^2\theta_c \exp\left(-\frac{m_e}{2T}v_{\|o}^2\tan^2\theta_c\right) W. \tag{26}$$

The appropriate combination of Equations (19), (23) and (26) results in the following relationship:

$$j \leq \frac{m_e\sigma}{e}\frac{3v_{\|o}}{\tau_E}\left(\frac{m_e v_{\|o}^2\tan^2\theta_c}{2T}\right)\exp\left(-\frac{m_e}{2T}v_{\|o}^2\tan^2\theta_c\right). \tag{27}$$

In a typical tokamak system, $\theta c$ is given by $$\cos\theta_c = \sqrt{\epsilon} \tag{28}$$

where $\epsilon$ is the inverse aspect ratio. For a tokamak plasma system, Equation (24) becomes approximately:

$$j \leq \frac{m_e\sigma}{e}\frac{1}{\tau_E}\sqrt{\frac{2T}{m_e}}\sqrt{\frac{\epsilon}{1-\epsilon}}. \tag{29}$$

The magnetohydrodynamic stability condition limits the current density to a value given by $$j = \frac{2B_t}{R\mu_o q} \tag{30}$$

where R is the major radius, $B_t$ is the toroidal magnetic field, and q is the safety factor. Typically, the valve of j for a large tokamak plasma system may be $5\times 10^5$ amp/m².

Since the right-hand side of Equation (29) is proportional to $T^2$, it may be considered to represent the condition for the lower limit on temperature.

$$\left(\frac{T}{e}\right) \geq 17(j\tau_E)^{1/2}\left(\frac{1-\epsilon}{\epsilon}\right)^{1/2}. \tag{31}$$

For $j=5\times10^5$ amp/m², $\tau_E=1$ sec, and $\epsilon=\frac{1}{3}$ we obtain $$T \geq 1.4\times 10^4 \text{eV} \tag{32}$$

It should be noted that the indicated temperature value is not far from the optimum operating temperature of a tokamak fusion reactor in accordance with known principles.

In steady state radio frequency trapping (or detrapping) heating, over an extended time period the plasma ions will gain momentum due to the friction with electrons. The ion momentum may be cancelled, for example, bt applying counter-current radio frequency ion cyclotron resonance energy, at an appropriately much lower power level, in accordance with principles previously set forth herein.

It has been shown that a plasma current in a toroidal plasma system such as a tokamak system may be sustained by using a radio-frequency heating induced, asymmetrical trapping (or detrapping) phenomenon. Although electron cyclotron resonance frequencies are used in the preceding description for discussion purposes, other resonances such as the lower hybrid wave may be utilized, and may be preferred inpractice. Electron cyclotron resonance has the disadvantage of requiring a very short wave length microwave generator, and also the wave will not penetrate the plasma if the plasma frequency is larger than the cyclotron frequency. In the selection of other suitable wave resonances, it should be recognized that the wave utilized should have a resonance and should heat the electron perpendicular energy for asymmetrical trapping, and should heat the electron parallel energy for asymmetrical detrapping.

Figure 1:
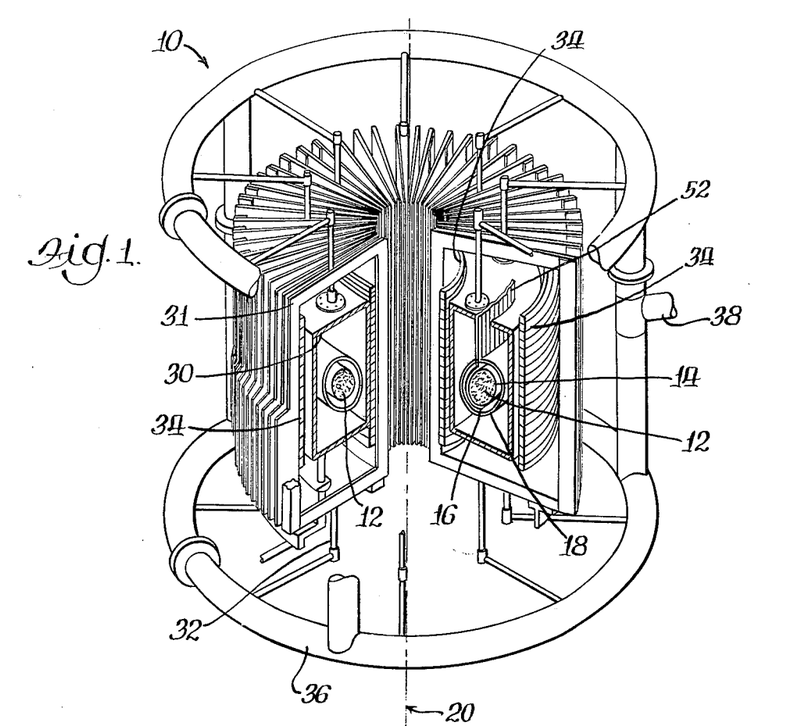
FIG. 1 is a perspective view, partially broken away, of a toroidal plasma confinement system illustrating an embodiment of the present invention.

Turning now to the drawings, the invention will now be more particularly described with respect to the embodiment of apparatus illustrated in FIG. 1.

Illustrated in FIG. 1 is a toroidal plasma confinement apparatus 10 of the tokamak type which is adapted for providing a plasma 12 of circular cross section. The boundary 14 of the plasma 12 is schematically represented by a closed, equidensity surface, in terms of mass density, which encloses substantially all of the plasma (e.g., 95% or more of the plasma mass). The plasma 12 is contained in a toroidal zone 16 defined by a toroidal conducting shell 18 of circular cross section and which is generally radially symmetrical about the longitudinal major toroidal axis 20 of the apparatus 10. It will be appreciated that while the illustrated plasma 12 boundary 14 toroidal zone 16 and conducting shell 18 are of circular cross section, they may have other shapes such as a doublet shape (or higher multiplet). The conducting shell 18 is provided with appropriate access ports for vacuum and gas supply, in accordance with known construction. The interior walls of the shell 18 may be protected by a liner (not shown) fabricated of graphite, silicon carbide, or some other suitable low atomic number material which minimizes the impurity effects of wall material sputtered back into the plasma as a result of charged particle bombardment of the liner.

External of the shell 18 is the vacuum chamber 30, which is made of an electrically insulating material and which may have a thin metallic coating to avoid introduction of an excessive amount of impurities into the plasma zone. The vacuum chamber is hermetically sealed, and is provided with conduits 32 as an access port. Surrounding the vacuum chamber 30 are toroidal field producing coils 31 which produce the toroidal magnetic field in the plasma zone within the conducting shell 18. The toroidal coils 31 may be supplied current from a suitable d-c power source (not shown) such as a lead acid battery bank.

Externally of the vacuum chamber 30, but internally of the toroidal coils 31, is an additional set of magnetic coils 34 which may be driven by an appropriate capacitor bank power system (not shown). The coils 34 are electric field induction coils, which function to ionize the plasma 12 and induce an initial plasma current. A radially symmetrical manifold array 36, which may be connected to a vacuum system (not shown) via outlet ports and piping 38, communicates with the interior of the vacuum chamber 30 by means of ports 32. Associated piping and ports for hydrogen (e.g. deuterium-tritium mixtures) supply for plasma generators are also provided.

These previously described elements or toroidal apparatus 10 are conventional in the plasma art and need not be further described in detail.

Figure 2:
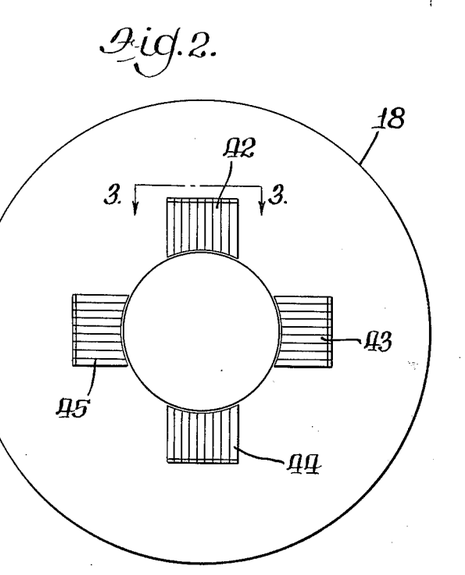
FIG. 2 is a partial top view taken through line 2—2 of the toroidal plasma confinement system of FIG. 1 illustrating radio frequency, asymmetric detrapping waveguide and antenna elements of the apparatus of FIG. 1.
Figure 3:
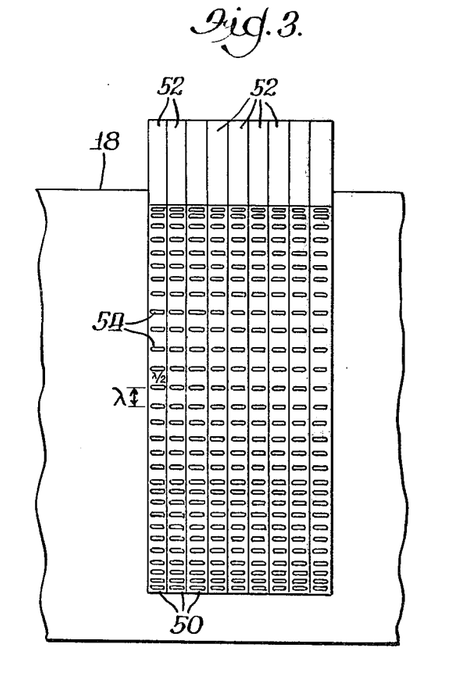
FIG. 3 is a sectional side view of the plasma chamber of FIG. 1 taken along line 3—3.

The embodiment of apparatus 10 further includes means 40 for selectively trapping electrons in the toroidal magnetic field. In the embodiment illustrated in FIG. 1 this selective trapping is carried out by each of a plurality of substantially identical antenna elements 42, 43, 44, 45 which are vertically oriented with respect to the major axis of the toroidal system and located adjacent to the interior surface of the shell 18 in the region of higher magnetic field strength. The four antenna elements 42, 43, 44, 45 are regularly spaced at equidistant intervals about the interior wall of the plasma confinement zone such that the antenna elements are spaced at successive 90° intervals in a plane perpendicular to the major axis of the apparatus 10. The antenna elements each comprise a plurality of substantially identical waveguide units 50 which are more fully illustrated in FIGS. 2 and 3. As shown in FIGS. 2 and 3, the waveguide units 50 of each antenna element are disposed in uniform, vertically oriented array in adjacent relationship conforming to the toroidal interior surface of the plasma zone. Each of the waveguide units 50 is provided with a waveguide channel 52 communicating with a suitable radio frequency generator (not shown) and transmission line (not shown). The radio frequency generators may comprise a plurality of amplifiers driven by a single source, to produce the desired output power. The radio frequency generator supplies r-f energy at a predetermined wavelength adapted to increase the perpendicular velocity component of plasma electrons in accordance with previously discussed principles.

In order to provide the appropriate r-f field within the plasma zone, each of the waveguide units is provided with a plurality of slot radiators 54 having a length dimension of approximately half the free space wave length, $\lambda$, of the r-f output of the radio frequency generators. The slot radiators as shown in FIG. 3 are spaced at one wave length, $\lambda$, intervals along the longitudinal direction of each of the waveguide units 50, and the slot radiators of each of the waveguide units 50 are adjacently disposed to form radiating surfaces of the respective antenna elements 42, 43, 44, 45 having a regular array of slot radiators thereon. The antenna enters at the top of the shell 18 and is confined to the higher field strength region to provide for entry of r-f energy to the system.

As indicated, the waveguide units 50 are each provided with a suitable transmission line and radio frequency power source. In this connection, the waveguide units 50 of an antenna element 42, 43, 44, or 45 may be supplied with radio frequency energy in particular phase relationship with respect to the other units 50 or the antenna element, such that the antenna element may provide a relatively narrow r-f beam which may be adjusted in propagation angle with respect to the toroidal magnetic field. The desired phase relationship may be provided by appropriately phased individual r-f power sources for each waveguide unit, such as by inserting an appropriate phase shifting array between an r-f source and the r-f power amplifiers in a known manner. The electric field component of the r-f beam is vertical with respect to the illustration of FIG. 1 (i.e., in a plane passing through or parallel to major axis 20). The provision of a propagation angle which may be shallow with respect to the minor axis provides for increasing damping at the cyclotron layer, and accordingly increases absorption efficiency. The electric field component is thus also perpendicular to the toroidal field, and the full, confining magnetic field (because the poloidal field is relatively weak with respect to the toroidal field).

In operation of the illustrated embodiment, a toroidal magnetic field is provided, and plasma is created in a conventional manner in the toroidal plasma zone with capacitor bank discharge through the inductive coils to provide an initial pulsed ohmic flow in the plasma and an initial poloidal field. This produces a plasma population with trapped and untrapped electrons. The trapping means is then operated to asymmetrically trap plasma electrons to provide for continuation of the ohmic current in the original direction of the initial plasma current flow and maintenance of the initial poloidal field.

Thus, through the operation of the selective trapping means 40, electrons are selectively detrapped in one direction, and an enormous current flow resulting from the selective asymmetric detrapping of electrons is produced to provide for a continuous current in the plasma. Since the resulting current flow is along the minor axial direction, the current flow produces the poloidal confining field for continuous compression and confinement of the plasma and accomodates steady-state operation of the plasma system.

The ions, which in a hydrogen plasma will be protons, may be similarly trapped in a current complementary direction by a similar antenna radiator system and radio frequency generator source operating at an appropriate wavelength for interaction with the proton particles.

Apparatus and methods in accordance with the present invention have particular utility in the study and analysis of the properties and behavior of plasmas, and in particular, the study of analysis of toroidal plasmas which are magnetically confined under prolonged or steady-state conditions. The systems may also be used as auxiliary toroidal plasma heating systems in conjunction with other heating systems.

The illustrated embodiment is particularly adapted for use in the generation, confinement, study and analysis of hydrogen plasmas (i.e., hydrogen, deuterium, tritium and mixtures thereof such as deuterium-tritium mixtures) at high temperatures, although the invention may also be used in the production of plasmas containing highly stripped elements of higher atomic number. Accordingly, the methods and apparatus of the present invention find utility as analytical techniques and instrumentation in respect of matter in the plasma state. In this connection, the apparatus may be provided with conventional diagnostic and measurement elements including magnetic probes, inductive pickup loops, particle detectors, photographic and spectrographic systems, microwave and infra-red detection systems and other appropriate elements, the data outputs of which may be utilized directly or recorded, such as by transient data recorders.

The various aspects of the invention may also find utility as, or in the design or development of, fusion systems, which of course, need not necessarily be net power producers in order to be utilizable as neutron or other particle or fusion product generators, isotope generators, etc.

It is of course further understood that although a specific embodiment of the present invention is illustrated and described, various modifications thereof will be apparent to those skilled in the art and, accordingly, the scope of the present invention should be defined only by the appended claims and equivalents thereof. For example, the invention may be utilized in toroidal plasma systems with elongated plasma cross section such as doublet or higher multiplet cross section produced by suitably shaped conducting shells or by appropriately designed field shaping coils.

Various features of the invention are set forth in the following claims.

What is claimed is:

1. In apparatus for generating and confining a toroidal plasma comprising means for providing a toroidal magnetic field in a plasma zone, said toroidal field being of increasing strength with decreasing radial distance from the major toroidal axis, and means for generating a plasma in the plasma zone, said plasma having a dynamic trapped particle population of electrons, which reflect back and forth along the minor toroidal axis without contributing to the net toroidal plasma current, the improvement comprising means for asymmetrically altering the trapped electron particle population with respect to the minor toroidal axis to produce an ohmic plasma current along the minor toroidal axis.

2. Apparatus in accordance with claim 1 wherein said trapped particle population altering means comprises means for asymmetrically trapping plasma electrons.

3. Apparatus in accordance with claim 2 wherein said trapping means comprises means for providing an r-f field which propagates in a direction parallel to the plasma-confining magnetic field, said r-f field having an electric field vector perpendicular to said confining field, and being at resonance with a plasma resonance frequency, to increase electron perpendicular velocity.

4. Apparatus in accordance with claim 3 wherein said frequency is an electron cyclotron resonance frequency.

5. A method for providing a toroidal plasma current comprising the steps of
   providing a toroidal magnetic field in a plasma confinement zone, said toroidal field being of increasing magnetic strength with decreasing distance from the major toroidal axis,
   providing a plasma in said plasma zone and an initial toroidal current in said plasma to produce a poloidal field, said toroidal field and said poloidal field producing a plasma confining magnetic field, said plasma having a dynamic trapped particle population of electrons which reflect back and forth along the minor toroidal axis without contributing to the net toroidal plasma current, and
   increasing the electron perpendicular velocity to asymmetrically trap plasma electrons with respect to the minor toroidal axis to produce a net current in said plasma.

6. A method in accordance with claim 5 wherein said electron perpendicular velocity is increased by applying an r-f field which propagates in a direction parallel to the plasma confining magnetic field, said r-f field having an electric field vector perpendicular to said confining field and being at resonance with a plasma resonance frequency to increase electron perpendicular velocity.

7. A method in accordance with claim 6 wherein said frequency is an electron cyclotron resonance frequency.

8. Apparatus in accordance with claim 1 further including means for applying counter-current r-f ion cyclotron resonance energy to cancel ion momentum resulting from electron friction.

9. A method in accordance with claim 5 further including the step of applying counter current r-f ion cyclotron resonance energy for cancelling ion momentum from electron friction.

* * * * *